3,531,477
WATER SOLUBLE ALKALI METAL SALTS OF 1-(5'-NITROFURFURYLIDENEAMINO)-HYDANTOIN VINYLOGS

Solomon Aronovich Giller, Ulitsa Pernavas 10, kv. 76; Maria Vladislavovna Shimanskaya, Ulitsa Exporta 2-a, kv. 15; Vitold Edgarovich Egert, Ulitsa Gospitalju 53, kv. 4; and Karl Karlovich Venter, Ulitsa Kr. Barona 109, kv. 22, all of Riga, U.S.S.R.
No Drawing. Filed Apr. 3, 1967, Ser. No. 627,606
Int. Cl. C07d 49/32
U.S. Cl. 260—240                  3 Claims

---

ABSTRACT OF THE DISCLOSURE

Water soluble bacteriocidal agents of the formula:

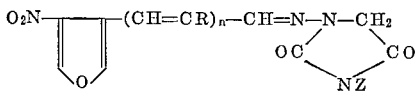

wherein R is hydrogen alkyl or alkoxymethyl, $n$ is one or two, and Z is sodium or potassium,
are prepared by dissolving a 1-(5'-nitrofurfurylideneamino)-hydantoin vinylog in an organic solvent and reacting the solution with an equimolecular amount of an alkali reagent in an alcohol solution.

---

This invention relates to new chemotherapeutic agents, which are alkali metal salts of 1-(5'-nitrofurfurylideneamino)-hydantoin vinylogs having the formula:

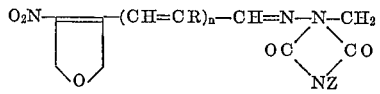

wherein R is hydrogen alkyl or alkoxymethyl, $n$ is one or two, and Z is sodium or potassium.

There are vinylogs of 1-(5'-nitrofurfurylideneamino)-hydantoin which are sparingly soluble in water. The presence of vinylidene groups in the side chains of these compounds considerably increases their antibacterial properties and their therapeutic effect. On the other hand, their presence largely diminishes the solubility in water. For example, while the solubility of the parent compound of this series-1-(5'-nitrofurfurylideneamino)-hydantoin is 1:25,000, that of its lower vinylogs, i.e., of 1-($\beta$-(5' nitrofuryl-2')-acrylideneamino)-hydantoin, falls to 1:40,000, and that of 1-(5''-(5'-nitrofuryl-2')-pentadien-2'',4''-al-1''-amino)-hydantoin drops as low as 1:113,000 which means that these compounds are practically insoluble in water. This low solubility constitutes a greater disadvantage of the known vinylogs of 1-(5'-nitrofurfurylideneamino)-hydantoin because it considerably narrows the scope of their application in medicine since it does not permit an increase in the concentration of the active substance in the blood, which is essential for the desired therapeutic effect.

Now, water soluble alkali metal salts of 1-(5'-nitrofurfurylideneamino)-hydantoin are known (Swiss Pat. 346,-549; U.S. Pat. 3,007,846; British Pat. 889,375). However, the antibacterial activity of 1-(5'-nitrofurfurylideneamino)-hydantoin as well as that of its salts is much lower than that of the vinylogs, and, accordingly, it produces a lower therepeutic effect.

An object of the present invention is to obtain new water soluble alkali metal salts of 1-(5'-nitrofurfurylideneamino)-hydantoin vinylogs, possessing both high antibacterial activity and good solubility in water.

Another object of this invention is to provide a process for the preparation of new water soluble alkali metal salts of 1-(5'-nitrofurfurylideneamino)-hydrantoin vinylogs by using a method which insures high quality of the end product.

Still another object of the invention is to provide sterile solutions of alkali metal salts of 1-($\beta$-(5'-nitrofuryl-2')-acrylideneamino)-hydantoin suitable for intravenous administration, and possessing chemotherapeutic activity and stability during sterilization and storage of the solution in ampoules.

In accordance with these and other objects, the present invention comprises preliminary dissolving 1-(5'-nitrofurfurylideneamino)-hydantoin vinylogs in an organic solvent, and reacting the thus obtained solution with an equimolecular amount of an alkali reagent in alcohol solution.

To achieve higher quality of the end product, an 0.1–0.15 N solution of sodium or potassium hydroxide in ethanol is preferably used as the alkali reagent. Acetone is preferably used as the organic solvent.

The procedure can be rendered more economical by employing as the organic solvent, the mother liquid remaining after precipitation of the water soluble salts of 1-(5'-nitrofurfurylideneamino)-hydantoin vinylogs, by recycling the mother liquor.

According to the invention sterile solutions of sodium and potassium salts of 1-($\beta$-5'-nitrofuryl-2')-acrylideneamino)-hydantoin for intravenous injection consisting of 1 part by weight of the sodium or potassium salt of 1-($\beta$-5'-nitrofuryl-2')-acrylideneamino)-hydantoin and of 500 to 1,500 parts by weight of an isotonic physiological solution of sodium chloride (PH 7.0–8.5) are prepared.

Stability of the above-mentioned sterile solutions is secured by means of pH control within the stated values and by avoiding the presence of carbon dioxide in the solutions. Such sterile solutions possess high chemotherapeutic activity.

The new water soluble alkali metal salts of 1-(5'-nitrofurfurylideneamino)-hydantoin vinylogs containing one or two conjugated vinylidene groups in their side chain, prepared according to the present invention, possess high antibacterial activity against a number of pathogenic microorganisms, for instance, Staphylococcus aureus haemol. 209, Bac. mycoides, E. coli, etc.

It is noted that the antibacterial properties of the water soluble alkali metal salts of 1-(5'-nitrofurfurylideneamino)-hydantoin vinylogs correspond to those of the initial compounds, 1-(5'-nitrofurfurylideneamino)-hydantoin vinylogs, which however are practically insoluble in water. However the solubility of the salts of these compounds in water is 80–500 times higher, thus making it possible to administer the above preparations not only orally but parenterally as well. This obviously widens the range of their use in medicine and provides a higher concentration of the active agent in the blood.

The water soluble alkali metal salts of 1-(5'-nitrofurfurylideneamino)-hydantoin are also freely soluble in an isotonic solution of sodium chloride and other suitable physiologically active media employed in medicine.

Preliminary clinical investigations (for instance, in urology, surgery, obstetrics and gynecology) have demonstrated the high therapeutic efficacy of the new compounds even in cases where antibiotics have failed. Practically no side effects have been observed.

The process of obtaining water soluble alkali metal salts of 1-(5'-nitrofurfurylideneamino)-hydantoin vinylogs is carried out as follows.

An alcoholic solution of alkali, e.g., an 0.1–0.15 N solution of sodium or potassium hydroxide in ethanol, is gradually added to a solution of 1-(5'-nitrofurfurylideneamino)-hydantoin vinylog in an organic solvent, e.g., in acetone. The amount of alkali must be strictly equimolecular. The crystalline precipitate of water soluble alkali metal salts of 1-(5'-nitrofurfurylideneamino)-hydantoin vinylogs is filtered off and dried in vacuo at room temperature.

For dissolving the 1-(5'-nitrofurfurylideneamino)-hydantoin vinylogs it is possible to recycle 2–3 times the mother liquor obtained after precipitation of the water soluble salts of 1-(5'-nitrofurfurylideneamino)-hydantoin vinylogs. This does not affect the high quality and yields of the end products, and makes the process more economical.

In order to secure higher quality of the end products all operations of the process are conducted in an atmosphere free of carbon dioxide. This prevents an undesirable side reaction which occurs in the presence of carbon dioxide, and which results in reducing the solubility of the end products in water.

The process of preparing sterile aqueous solutions of alkali metal salts of 1-[β-(5'-nitrofuryl-2')-acrylideneamino]-hydantoin is carried out as follows.

The pH of the aqueous medium (for instance an isotonic solution of sodium chloride) is first brought within the range of 7.0–8.5, by the addition of alkali, e.g., aqueous sodium hydroxide.

The sodium or potassium salt of 1-(β-(5'-nitrofuryl-2')-acrylideneamino)-hydantoin is then dissolved in said aqueous medium, taking 1 part by weight of the salt to 500–1,500 parts of said medium. The solution thus obtained is ampouled and sterilized at 102–105° C.

For a better understanding of the present invention the following examples are given by way of illustration.

EXAMPLE 1

16 g. (0.06 M) of 1-(β-(5'-nitrofuryl-2')-acrylideneamino)-hydantoin are dissolved at 20–25° C. in 10 l. of acetone with stirring over a period of 2 hours. The solution thus obtained is filtered. To the filtrate, 400 ml. of a filtered 0.15 N solution of potassium hydroxide in ethyl alcohol are slowly added from a burette with stirring at 18–20° C. over a period of 1 hour. An equimolecular amount, i.e., 3.366 g. (0.06 M), of potassium hydroxide is thereby added to the reaction mixture. The reaction apparatus communicates with the outer atmosphere through a tube filled with soda lime in order to prevent the action of atmospheric carbon dioxide on the reaction product. During the process of adding potassium hydroxide, the crystalline potassium salt of 1-(β-(5'-nitrofuryl-2')-acrylideneamino)-hydantoin is precipitated, which is left to settle for a period of 1 hour, and then filtered off. The product thus obtained is dried in a vacuum drier (residual pressure less than 10 mm. Hg) at a temperature of 20–25° C. Yield of potassium salt of 1-(β-(5'-nitrofuryl-2')-acrylideneamino)-hydantoin 16.6 g. (92% of theory).

Absorption maxima in UV spectrum of the above salt (in water): $\lambda_1=240m\mu$ (1 g. $\epsilon=4.05$); $\lambda_2=302m\mu$ (1 g. $\epsilon=4.34$); $\lambda_3=407m\mu$ (1 g. $\epsilon=4.36$). Found (percent): N 18.47. Calculated for $C_{10}H_7N_4O_5K$ (percent): N 18.54.

The mother liquor—about 9.5 l.—can be recycled 2–3 times for repeated syntheses without impairing the quality of the end product, after which the acetone is regenerated and can be used again in the process.

To prepare a sterile solution suitable for intravenous administration, the potassium salt of 1-(β-(5'-nitrofuryl-2')-acrylideneamino)-hydantoin is dissolved in an 0.9% isotonic solution of sodium chloride (the pH of which has been adjusted by the addition of sodium hydroxide solution within the range 7.0–8.5) so that the solution thus obtained contains 1 part by weight of potassium salt of 1 - (β - (5'-nitrofuryl-2')-acrylideneamino)-hydantoin in 1,000 parts by weight of isotonic solution. The solution is ampouled and sterilized at 102–105° C.

EXAMPLE 2

The process is carried out and the potassium salt of 1-(β-(5'-nitrofuryl-2')-acrylideneamino)-hydantoin is isolated under conditions analogous to those in Example 1, with the exception that the mother liquor recovered as described in Example 1 is used instead of fresh acetone for dissolving the 1 - (β - (5' - nitrofuryl-2')-acrylideneamino)-hydantoin.

EXAMPLE 3

To a solution of 10 g. (0.0379 M) of 1-(β-(5'-nitrofuryl-2')-acrylideneamino)-hydantoin in 10 l. of acetone at a temperature not exceeding 20° C., 379 ml. of an 0.1 N sollution of sodium hydroxide in ethyl alcohol are added dropwise with stirring, an equimolecular amount, i.e., 1.516 g. (0.0379 M), of sodium hydroxide being thereby added to the reaction mixture.

The crystalline sodium salt of 1-(β-(5'-nitrofuryl-2')-acrylideneamino)-hydantoin is precipitated and the reaction mass is left to settle for a period of 1 hour. It is then filtered off and dried in vacuo over phosphorus pentoxide at room temperature.

Yield of sodium salt of 1-(β-(5'-nitrofuryl-2')-acrylideneamino)-hydantoin 9.9 g. (91.7% of theory). Absorption maxima in UV spectrum of the above salt (in water): $\lambda_1=238m\mu$ (1 g. $\epsilon=3.97$); $\lambda_2=300m\mu$ (1 g. $\epsilon=4.32$); $\lambda_3=450m\mu$ (1 g. $\epsilon=4.34$). Found (percent): N, 19.65. Calculated for $C_{10}H_7N_4O_5Na$ (percent): N, 19.58.

To prepare a sterile solution suitable for intravenous administration, the sodium salt of 1-(β-(5'-nitrofuryl-2')-acrylideneamino)-hydantoin is dissolved in 0.9% isotonic solution of sodium chloride (the pH of which has been adjusted by the addition of sodium hydroxide solution within the range 7.0–8.5) so that the solution thus obtained contains 1 part by weight of sodium salt of 1-(β-(5'-nitrofuryl-2')-acrylideneamino)-hydantoin in 1,000 parts by weight of isotonic solution.

The solution is then ampouled and sterilized at 102–105° C.

EXAMPLE 4

The process is carried out and the sodium salt of 1-(β-(5'-nitrofuryl-2')-acrylideneamino)-hydantoin is isolated under conditions analogous to those in Example 3, with the exception that the mother liquor recovered as described in Example 3 is used instead of fresh acetone for dissolving the 1 - (β-(5'-nitrofuryl-2')-acrylideneamino)-hydantoin.

By methods described in Examples 1–3 the following water soluble salts have been obtained in good yields:

Potassium salt of 1 - (α - methyl-β-(5'-nitrofuryl-2')-acrylideneamino)-hydantoin. Found, percent: N 17.50. Calculated for $C_{11}H_9N_4O_5K$, percent: N 17.71.

Sodium salt of 1 - (α - methyl-β-(5'-nitrofuryl-2')-acrylideneamino)-hydantoin. Found, percent: N 18.78. Calculated for $C_{11}H_9N_4O_5Na$, percent: N 18.66.

Potassium salt of 1 - (α - ethyl-β-(5'-nitrofuryl-2')-acrylideneamino)-hydantoin. Found, percent: N 16.48. Calculated for $C_{12}H_{11}N_4O_5K$, percent: N 16.96.

Sodium salt of 1 - (α - ethyl-β-(5'-nitrofuryl-2')-acrylideneamino)-hydantoin. Found, percent: N 17.71. Calculated for $C_{12}H_{11}H_4O_5Na$, percent: N 17.83.

Potassium salt of 1 - (α - methoxymethyl-β-(5'-nitrofuryl-2')-acrylideneamino) - hydantoin. Found, percent: N 16.39. Calculated for $C_{12}H_{11}N_4O_6K$, percent: N 16.18.

Sodium salt of 1-(α-methoxymethyl-β-(5'-nitrofuryl-2') - acrylideneamino) - hydantoin. Found, percent: N 17.06. Calculated for $C_{12}H_{11}N_4O_6Na$, percent: N 17.27.

Potassium salt of 1 - (5''-(5'-nitrofuryl-2')-pentadien-2'', 4''-al-1''-amino)-hydantoin. Found, percent: N 17.10. Calculated for $C_{12}H_9N_4O_5K$, percent: N 17.07.

Sodium salt of 1 - (5'' - (5' - nitrofuryl-2')-pentadien-2''',4''-al-1''-amino)-hydantoin. Found, percent: N 18.11. Calculated for $C_{12}H_9N_4O_5Na$, percent: N 17.95.

Comparative data of the antibacterial properties of the previously known water soluble alkali metal salts of 1-(5'-nitrofurylideneamino)-hydantoin and of the newly synthesized alkali metal salts of 1-(5'-nitrofurfurylideneamino)-hydantoin vinylogs are presented in the accompanying table.

Although the present invention has been described in accordance with a preferred embodiment there may be made various modifications in carrying out the present invention without departing from the spirit and scope thereof as will be understood by those skilled in the art. These changes and modifications are to be considered as falling within the spirit and scope of the invention as defined in the appended claims.

TABLE

Compounds

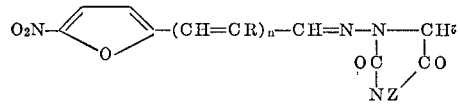

| n | R | Z | Staphylococcus aureus haemol. 209 | Bac. mycoides |
|---|---|---|---|---|
| 0 | | Na | 20.9 | 20.9 |
| 0 | | K | 20.9 | 41.8 |
| 1 | H | Na | 2.6 | 1.3 |
| 1 | H | K | 2.6 | 1.3 |
| 1 | $CH_3$ | Na | 20.8 | 1.3 |
| 1 | $CH_3$ | K | 20.8 | 0.6 |
| 1 | $C_2H_5$ | Na | 20.8 | 1.3 |
| 1 | $C_2H_5$ | K | 20.8 | 1.3 |
| 1 | $CH_2OCH_3$ | Na | 10.4 | 5.2 |
| 1 | $CH_2OCH_3$ | K | 10.4 | 1.3 |
| 2 | H | Na | 14.0 | 1.7 |
| 2 | H | K | 7.0 | 0.8 |

What we claim is:

1. Water soluble alkali metal salts of 1-(5'-nitrofurfurylideneamino)-hydantoin vinylogs of the formula:

$$O_2N-\underset{O}{\underline{\phantom{XXX}}}-(CH=CR)_n-CH=N-N\underset{\underset{NZ}{OC\ \ CO}}{\phantom{XX}}CH_2$$

wherein: R is a member of the group consisting of hydrogen, alkyl and alkoxymethyl groups, n is an integer from one to two, and Z is a member of the group consisting of sodium and potassium.

2. Water soluble alkali metal salts of 1-(5'-nitrofurfurylideneamino)-hydantoin vinylogs as claimed in claim 1, wherein R is methyl or ethyl.

3. Water soluble alkali metal salts of 1-(5'-nitrofurfurylideneamino)-hydantoin vinylogs as claimed in claim 1, wherein R is methoxymethyl.

References Cited

UNITED STATES PATENTS 3,007,846  11/1961  Gever et al. _____ 260—240 XR
3,157,645  11/1964  Spencer _____ 260—240

OTHER REFERENCES

Chemical Abstracts, vol. 50, cols. 1782 to 1783 (1956), (abstract of Uota et al.).

Chemical Abstracts, vol. 52, col. 14,287 (1958), (abstract of Stradins et al.).

JOHN D. RANDOLPH, Primary Examiner

U.S. Cl. X.R.

424—273